Feb. 9, 1926.                                                      1,572,611
W. C. LAUGHLIN
METHOD AND CENTRIFUGAL SEPARATOR FOR SEPARATING SOLIDS FROM LIQUIDS
Filed June 21, 1924.        2 Sheets-Sheet 1

INVENTOR
William C. Laughlin
BY
C. P. Goepel.
his ATTORNEY

Feb. 9, 1926.  1,572,611
W. C. LAUGHLIN
METHOD AND CENTRIFUGAL SEPARATOR FOR SEPARATING SOLIDS FROM LIQUIDS
Filed June 21, 1924  2 Sheets-Sheet 2
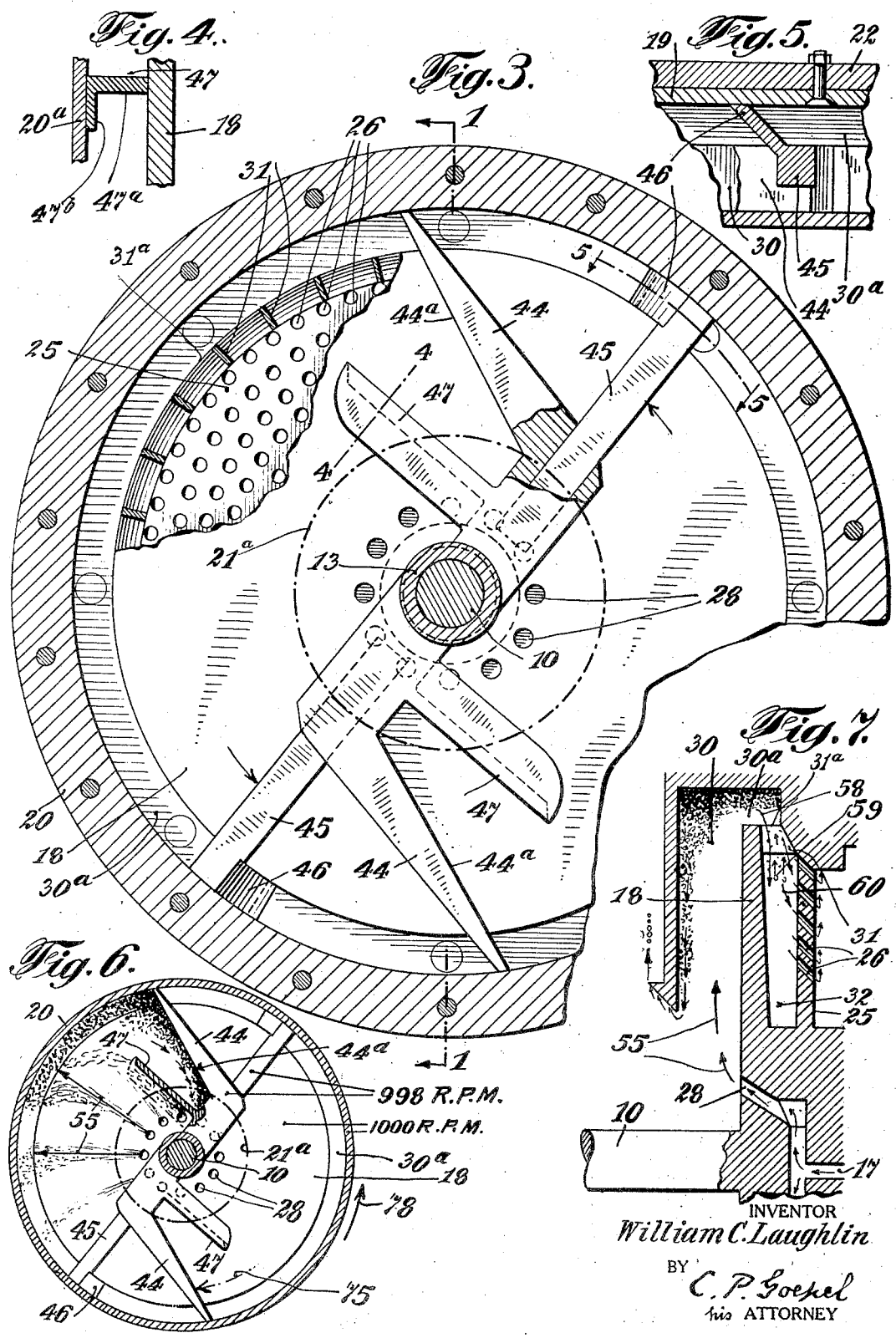
INVENTOR
William C. Laughlin
BY
C. P. Goepel
his ATTORNEY Patented Feb. 9, 1926.

1,572,611

UNITED STATES PATENT OFFICE.

WILLIAM C. LAUGHLIN, OF GLENDALE, CALIFORNIA, ASSIGNOR TO LAUGHLIN FILTER CORPORATION, OF NEW YORK, N. Y., A CORPORATION OF DELAWARE.

METHOD AND CENTRIFUGAL SEPARATOR FOR SEPARATING SOLIDS FROM LIQUIDS.

Application filed June 21, 1924. Serial No. 721,531.

*To all whom it may concern:*

Be it known that I, WILLIAM C. LAUGHLIN, a citizen of the United States, and resident of Glendale, in the county of Los Angeles and State of California, have invented new and useful Improvements in Methods and Centrifugal Separators for Separating Solids from Liquids, of which the following is a specification.

This invention relates to centrifugal separators for separating solids from liquids and also relates to the method of separating solids from liquids.

Heretofore I have filed applications under Serial No. 626,260, filed March 20, 1923; No. 646,810, filed June 21, 1923; No. 665,622, filed September 29, 1923; and No. 670,425, filed October 24, 1923; to which reference is hereby made.

The particular object of my present invention is to provide improved means for separating solids from liquids, and to provide for their individual removal.

More particularly, the object of the invention is to provide means by which the solid material to be separated from the liquid is subjected essentially only to radial outward movements while it is being subjected to the separating action of centrifugal forces, so that angular movements of the solids through fixed orifices is thereby avoided.

Furthermore, the invention provides means wherein the material to be separated enters a chamber and is separated therein, with the liquid passing out of one end of said chamber, and the solids passing out of the end of the chamber at which the material to be separated entered, the movement of the material to be separated being in opposite direction to the solids leaving the chamber. Preferably, this action is carried out in one chamber. This machine is designed to take care of the bulk of this separating action in one chamber.

Furthermore, the invention comprises means so arranged that the members bringing about the separation of the solids from the liquids rotate at one speed, and the means for withdrawing the solids operate at a less speed, as a result of which the solid portions of the material to be separated, after such material has been subjected to centrifugal forces to bring about separation, is withdrawn from the apparatus, and during the time of such withdrawal is also subjected to the centrifugal forces.

Furthermore and more particularly, the means provided for drawing back the solids separated are provided with a definite angle in relation to the radius. It has been found that an angle of twenty (20) degrees has been most efficient for the separation of solids from liquids which had been operated upon but a variation in the material under treatment may cause a change in this angle.

Furthermore, in certain embodiments of my invention it is advantageous to provide a secondary separating chamber in which the discharge of the first separation enters and is there subjected again to the action of centrifugal forces so that any heavier particles entrained in the liquid discharge will be separated therein and guided so as to join the heavier separated particles of the primary chamber. In addition to this, in certain embodiments, the second discharge may be subjected to a dampening flow action, as for instance, by the provision of a filter medium or the like, so as to enable either finer or heavier particles to be subjected for a sufficient length of time to the centrifugal actions of the secondary chamber, and in certain cases also to bring about a coagulation of the colloidal constituents, whereby the coagulated parts will be more readily adapted to be subjected to the centrifugal forces and thereby be thrown radially outwardly and back into the primary or main operating chamber.

The invention also provides means whereby the bulk is removed in the main operating chamber and the aforesaid secondary chamber is provided in a manner so as to act in the nature of a clarification chamber, both chambers however, intercommunicating with each other, and by this arrangement of a clarification chamber, the remaining finer particles can more readily be separated, since they are not subjected to those strains, stresses and currents created by the presence of the bulk of coarser particles being separated, due to removal of bulk of solids in the primary chamber.

The invention will be more fully described hereinafter, the embodiments therefor shown in the drawings and finally pointed out in the claims.

In the accompanying drawings,

Figure 3 is a vertical transverse section, taken on line 3—3 of Figure 1;

Figure 4 is a section taken on line 4—4 of Figure 3;

Figure 5 is a section taken on line 5—5 of Figure 3;

Figure 6 is a diagrammatic view, arranged similar to the parts shown in Figure 3 showing the general action of the material to be separated while it enters the main chamber and the action of the heavier particles as they leave the main chamber and are discharged from the apparatus;

Figure 7 is also a diagrammatic view, showing the entrance of the material to be separated, the discharge of the heavier particles, and the action of the liquid and heavier particles in the clarifying chamber adjacent to the main chamber.

Similar characters of reference indicate corresponding parts throughout the various views.

Figure 1:
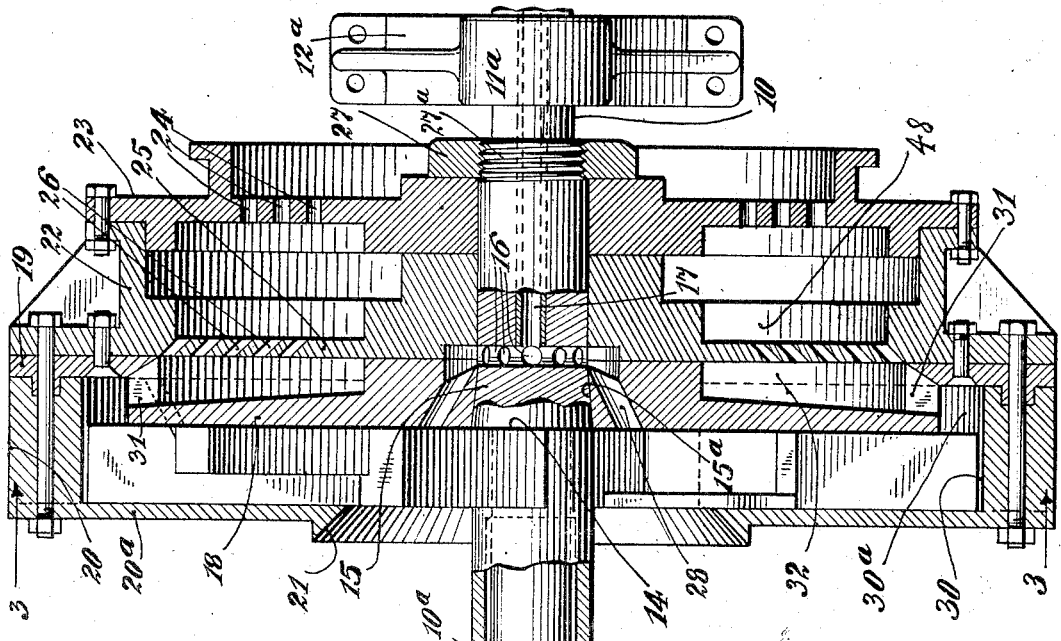
Figure 1 is a longitudinal, central section, taken on line 1—1 of Figure 3.
Figure 2:
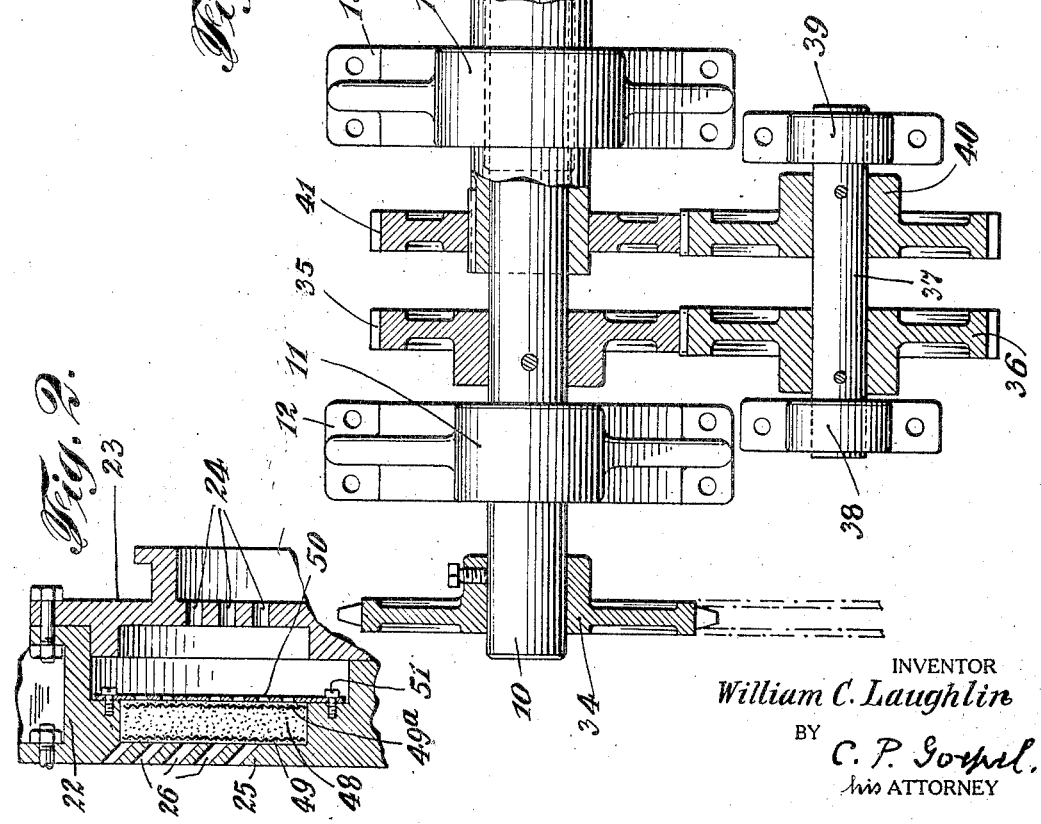
Figure 2 is a sectional view of the filtering medium chamber utilized in some embodiments of the invention.

Referring to the drawings and more particularly to Figure 1, a shaft 10 is suitably supported by ball-bearing supports 11 arranged on a standard 12. This shaft 10 extends through the apparatus and at its other end is supported by ball-bearing supports 11$^a$, supported by a standard 12$^a$. Between the ends of the shaft 10 a hollow sleeve 13 is provided, which surrounds the shaft 10 and which is supported by ball-bearing supports 13$^a$ on a standard 13$^b$. Between the sleeve 13 and the shaft 10 a hollow space 10$^a$ is provided to provide lubrication. The sleeve 13 terminates at 14 and at this end of the sleeve 13 the shaft 10 is provided with a shoulder 15, and thereafter the shaft 15 tapers, as shown in the drawings by the line 15$^a$. The shaft 10 is then provided with a plurality of radial channels 16, which communicate with a central channel 17, which extends from these radial channels 16 outwardly to the end of the shaft. At this end of the shaft, this central conduit or channel 17 is suitably connected in any well-known manner to a feed pipe leading to the feed reservoir. The feed pipe in channel 17 is fixed and does not rotate. On the shaft 10, at its tapering portion, is mounted so as to be rotatable therewith, a disc 18, which has thereon, at its radial extremities, an extension 19, which is secured to a casing wall 20, which extends downwardly, as indicated by 20$^a$ to the mud or heavy particle outlet opening 21. This opening is preferably provided with a tapering portion to facilitate the discharge flow of the material.

At the other side of the extension 19 a casing wall 22 is provided, which has secured thereto an end cap 23, having therein outlet openings 24 for the discharge of the liquids. The casing 22 has an inwardly extending portion 25 provided with openings 26, which openings have inclined walls, as shown in Figure 1. The wall 25 extends downwardly and also rests on the shaft 10. A lock nut 27 is mounted on the shaft 10, engaging screw threads 27$^a$ of the shaft and the pressure of the lock nut 27 upon the end plate 23, the portion 25 forcing against the disc 18 and the tapering portion of the shaft gives a secure hold, whereby all these parts rotate with the shaft 10.

The disc 18 is also provided with conduits 28, inclined in position to permit the material to be separated and which passes through the conduit 17 and opening 16 to enter into the main chamber 30 formed by the casing 20. In the disc 18 and between its peripheral portion and the extension 19, openings are provided which are separated by partitions 31, which openings communicate at one end thereof with the main chamber 30 and at the other end thereof with the auxiliary or clarifying chamber 32. The main chamber extends over the openings formed by the partitions 31 so as to have the main chamber 30 radially outward of the openings formed by the partitions 31.

To the shaft 10, at one end thereof, a sprocket or pulley 34 is secured, which is suitably operated by belts or chains so as to drive the shaft 10 at the necessary speed. To the shaft 10 is also secured a gear 35, which meshes with a gear 36 secured to a shaft 37. This shaft is supported at both ends thereof by suitable ball-bearing supports 38 and 39. To this shaft 37 is also secured a gear wheel 40, which meshes with the gear wheel 41, secured to the sleeve 13. These gear wheels are so arranged as to provide a differential speed between the gear wheel 35 and the gear wheel 41, whereby there is a differential of speed between the shaft 10 and the sleeve 13. An arrangement of gears and the number of teeth, etc., to provide such differential action is well-known in the art and therefore is not further described in detail. The object, however, of this differential of speed is to provide means whereby the casing forming the main chamber and the auxiliary chamber may be rotated at one speed and certain means for drawing back the heavier particles and discharging them from the main chamber may operate at a different speed. These mud withdrawing means consist preferably of arms 44 secured to the sleeve 13, as shown in Figure 3. These arms have inserted therein or otherwise affixed radial extending arms 45, which are provided with paddles 46 entering into the lateral partitions 30ª of the main chamber 30 and above the openings formed by the partitions 31. Such an arm 45 with paddle 46 is clearly shown in Figure 5. The arms 44 also have inclined arms 44ª, which extend at an angle, which I have found satisfactory at 20 degrees to the radial line passing through the center of the shaft 10 and extending substantially to the periphery of the main chamber 30. Inwardly of the arms 44ª, the arms 44 also support a deflecting member 47 which has a position in respect to the arm 44 as to cover the inlet openings 28, as the deflecting member rotates thereover. This deflecting member consists of one leg 47ª and another leg 47ᵇ at right angles thereto, the partition 47ᵇ being parallel with the inner surface of the end plate 20ª. The free end of the leg 47ª passes over the disc 18, as shown in Figure 4, and is not secured thereto. In other words, the deflecting member 47 as moved with the arm 44, passes through the chamber 30, between the disc 18 and the outer wall 20ª.

As before stated, the differential of speeds between the disc 18 and end plate 20ª on the one hand, and the inclined arms 44 on the other hand, is such that the arm 44 acts with a retarded motion. In view thereof, it gathers the solids and guides them from the peripheral portion of the main chamber toward the center thereof, against the action of the centrifugal forces, until the solids are discharged.

In certain cases it is desirable to retard any solid matter which might still be entrained in the liquid and for this purpose means for introducing filtering media are provided at the discharge ends of the inclined openings 26. For this purpose the casing portion 22 is provided with a suitable cavity 48 in which is a filtering media, consisting preferably of screens 49 and 49ª with any suitable material therebetween, and also of a perforated plate 50 suitably secured by screws 51. The effect of this filtering medium is to exert a retarding and coagulating influence on the remaining suspended solids. As a result of this, the solid matter is retained to a large extent in the auxiliary chamber 32 and is thereby further subjected to centrifugal actions and thrown radially outwardly through the openings 31ª between the partitions 31 into the chamber 30ª. Also such solid matter may thereby accumulate along the walls of the openings 26, and any colloidal portions may coagulate and thereby are rendered more easly subject to the centrifugal forces.

The operation of my improved device is as follows, and for this purpose reference is preferably made to Figures 6 and 7 of the drawings:

The material to be separated enters at the conduits 17, and passes through the outlet openings 28 and by virtue of the rapid rotation of the parts is forced radially outwardly in the direction of the arrows 55, though due to the rotative effects, they are slightly deflected, as shown in Figure 6. The material to be separated being thus under rotative and centrifugal force, has the heavier particles or the solids separated from the lighter particles or the liquids, the heavier particles or solids accumulating at the peripheral portion of the main chamber 30, as clearly shown in Figure 7. Certain of these solids extend over into the lateral portion 30ª of the main chamber 30.

In order to at all times provide free movement of the liquids from the main chamber 30 into the clarifying or secondary chamber 32, the paddle 46 moves through the lateral portion of the main chamber 30 and pushes these accumulated solids into the path of movement of the arms 44. In the clarifying chamber, into which the liquid portions enter, as indicated by arrow 58, certain of the solids still entrained are also subjected to centrifugal action, and as a result thereof these heavier particles, indicated by arrow 59, are separated from the liquids, indicated by the arrow 60.

The solids 59 are then thrown outwardly by centrifugal force through the openings 31ª between the partitions 31 and substantially into the path of the paddle 46. The lighter or liquid portions, indicated by arrow 60, pass through the inclined conduits 26, as before stated, and finally are discharged from the machine. The radial distance of the openings 24 in respect to the central line of the ten inch opening 21ª of Fig. 6 determine the level of the fluids within the apparatus.

As the solids have been thrown into the path of the arms 44, both by centrifugal force itself, as also by the action of the paddles 46, the arm 44, having a retarding effect with relation to the housing gathers up the solids and causes them to move along its inclined surface 44ª, having an angle of approximately twenty degrees (20°) in respect to the radial, and thereby gradually forces the solids inwardly against the action of centrifugal force until they exude or are discharged at the opening 21 of the apparatus. In order to prevent the inflowing material which is to be separated from coming in direct contact with the gathered solids when gathered by the arm 44ª, the deflecting member 47 is provided, which serves to deflect the incoming material to be separated away from the gathered solids. It is for this reason that the deflecting member 47 is made of two legs 47ª and 47ᵇ, the leg 47ª acting only as a division wall, but since such division wall when impinged by the incoming fluid would spray the same, the leg 47ᵇ is provided.

It will, therefore, be seen that the material to be separated is subjected at all times to a radially outward direction. So as to subject it during this flow to centrifugal actions that the heavier particles or solids are removed contrary to the action of centrifugal force, in the same chamber which is supplied with the material to be separated, an auxiliary chamber is provided, which acts as a clarifying chamber so as to throw into the main chamber the solids. The differential action of the main chamber and solid removing means permits the solids to be readily removed.

Preferably, and as an example only, the main centrifugal separating means rotate at 1000 revolutions per minute in the direction of the arrow 78, and the solid withdrawing and discharging means in the same direction as shown by the arrow 75, rotate at 998 revolutions per minute.

It will be noted that the machine described provides for a continuous feed and a continuous discharge, both as to the solids or mud and the separated liquids. It will also be noted that the machine comprises an operation which provides for the separation of the solids from the liquids, without subjecting the same to angular movements through fixed orifices; also that the solids gathered in the peripheral portion of the machine, due to the action of the centrifugal forces, are scooped and guided substantially radially inwardly from the peripheral portion of the machine to the discharge portion of the solids, this movement from the peripheral portion toward the central portion of the machine of the separated solids being against the centrifugal forces. It will also be noted that the differential action brought about by the respective rotational speeds acts in a sense to move the respective parts in opposite direction to each other, though their general direction of movement is the same.

In addition to the mechanism hereinabove described, the invention consists further of the novel method of separating solids from liquids, which consists in subjecting the material to be separated to a continuous feed and continuously discharging the separated solids and the separated liquids; the method of removing the separated solids against the action of centrifugal forces; the method of separating the solids and removing the same without any angular movements of the said separated solids, and the method of subjecting the material to be separated to a certain speed, and the separated solids to a less speed of rotation, the differential action of such speeds enabling the separated solids to be separated and removed.

I have hereinbefore described several embodiments of my invention but do not wish to be limited in the details thereof since changes may be made therein without departing from the spirit of the invention, as defined in the appended claims.

I claim:

1. In centrifugal separation, a rotary casing having a separating chamber in the peripheral portion of the same and an axial discharge throat in communication with said chamber, means for supplying material for separation into the axial portion of the casing, rotating guide means within the casing for directing solid material from the separating chamber inwardly to the axial discharge throat and deflecting means located inwardly of said guide means and forwardly of same in the direction of rotation for deflecting entering material clear of the guide means.

2. In centrifugal separation, a rotary casing having communicating primary and secondary separating chambers with a passage for discharge of solids extending from the primary chamber to an axial discharge throat, and a liquid discharge passage extending in reverse direction from the secondary chamber.

3. A centrifugal machine, comprising a casing rotatable at a certain speed, said casing having a primary separating chamber and a secondary separating chamber, means for supplying material to be separated to said casing at the axial part thereof and directing it to the primary chamber, means within the primary chamber rotatable at a speed less than that of the casing for removing the solid materials and guiding the same exterior of the casing, means for guiding the primary to the secondary chamber, said secondary chamber being open to the primary chamber to permit the last separated solid material to pass back into the primary chamber and within reach of said removing means.

4. A centrifugal machine, comprising a casing rotatable at a certain speed, means for supplying material to be separated to said casing at the axial part thereof, arms within the casing for collecting the heavier material and guiding the same exterior to the casing, said arms being rotatable with the casing but at a less speed and guide means in advance of said arms and nearer the axial portion of the casing, for deflecting the entering material away from said arms.

5. A centrifugal machine, comprising a casing rotatable at a certain speed, means for supplying material to be separated to said casing at the axial part thereof, means within the casing comprising arms and deflecting members for collecting and moving the heavier material separated from the material being separated from the peripheral portion of the casing towards the axial portion thereof for discharging it from said axial portion.

6. A centrifugal machine, comprising a casing rotatable at a certain speed, enclosing primary chamber, a secondary chamber and a filtering chamber, means for supplying to the primary chamber the material to be separated, means within the primary chamber for removing therefrom the heavier material separated from the material fed to the casing, means guiding to the secondary chamber the lighter material of the material separated, and means guiding from the secondary chamber to the filtering chamber said lighter material.

7. A centrifugal machine, comprising a casing having a primary and secondary chamber, said primary chamber for separating the heavier portions from the lighter portions and said secondary chamber for receiving the portions still entrained, a shaft for said casing, means within the casing for removing from the casing the heavier materials, a second shaft or sleeve for said last named means, and operative means for rotating the said shaft and sleeve at different speeds.

8. A centrifugal machine, comprising a hollow shaft adapted to be fed with material to be separated, a conduit connected with said hollow shaft for guiding the said material, a casing surrounding said conduit, the said casing comprising a primary chamber and a secondary chamber, means within the primary chamber for collecting and removing therefrom the heavier portions of the materials being separated, means for discharging from the secondary chamber the lighter portions of the material being separated, and means for rotating the casing and said collecting and removing means at different speeds.

9. A centrifugal machine, comprising a casing rotatable at a certain speed, provided with a primary chamber and a secondary chamber, a series of partitions between the primary and secondary chambers provided with openings between the partitions for bringing about a communication of the primary and secondary chambers, and means removing the separated solids from the primary chamber radially inwardly toward the central part of the primary chamber, and means for removing from the secondary chamber into the primary chamber entrained solids from the liquid.

10. A centrifugal machine, comprising a casing having a primary chamber, a secondary chamber, and a filtering chamber, a perforated wall between the primary and secondary chambers, a perforated wall between the secondary and the filtering chamber, and means for removing the solids entrained within the filtering chamber, entrained within the secondary chamber and the solids separated and gathered in the primary chamber.

11. A centrifugal machine, comprising a casing, means therein for separating the solids from liquids under the action of centrifugal forces, means for removing therefrom the separated solids, means for feeding into the casing the material to be separated, and means for guiding the material entering the casing peripherally outwardly past the inward movement of the separated solids.

12. A centrifugal machine, comprising a casing, means for feeding into the casing the materials to be separated, means within the casing for gathering and removing the separated solids, means disposed at a distance from the aforesaid means for guiding certain of the entering material radially outwardly, said last named means having deflecting means thereon to prevent the entering material from leaving the machine until it is separated, said solid gathering and removing means and said entering liquid guiding and deflecting means rotating at a different speed from that of the casing, and the said solid gathering and removing means and entering material guiding and deflecting means rotating at the same speed.

13. A centrifugal machine, comprising a casing, a shaft for said casing for rotating the same, said shaft being provided with a feed channel for supplying the interior of the casing with the material to be separated, a sleeve over said shaft, means for rotating said sleeve at a different speed of rotation than the shaft of the casing, arms on said sleeve, one of said arms extending to the peripheral portion of the casing and provided with a scoop entering into a peripheral channel of the casing, a second arm extending to the peripheral portion of the casing but not into the channel, and having an inclined surface directed from the peripheral portion of the casing toward the central portion of the casing, and a third arm disposed at a distance from said second arm in angular relation to the scoop holding arms, said third arm being provided with a deflecting member extending over the entering material, said third arm having a length shorter than that of the first and second arms.

14. A centrifugal machine, comprising a casing, a primary chamber therein having a peripheral channel laterally thereof, means for gathering and removing the separated solids from the peripheral portion of said primary chamber, and said peripheral channel, a secondary chamber within the casing in communication with the primary chamber, said second chamber being disposed radially inwardly of the lateral channel of the first chamber, and means for removing the separated solids from the primary chamber, at a point centrally of the primary and secondary chambers.

15. The method of separating solids from liquids, which consists in rotating the material to be separated at a certain speed for separating the solids from the liquids and moving the separated solids at a less speed while guiding the said solids from their place of separation to their discharge.

16. In centrifugal separation, a rotary casing having communicating primary and secondary separating chambers with a passage for discharge of solids extending from the primary chamber to an axial discharge throat, and a liquid discharge passage extending in reverse direction from the secondary chamber, toward the center of the casing to carry off separated liquid from the secondary chamber, and means within the primary chamber for directing solid material separated therein and derived from the secondary chamber inwardly to the axial discharge throat.

17. In centrifugal separation, a rotary casing having communicating primary and secondary separating chambers with a passage for discharge of solids extending from the primary chamber to an axial discharge throat, and a liquid discharge passage extending in reverse direction from the secondary chamber, toward the center of the casing to carry off separated liquid from the secondary chamber, means within the primary chamber for directing solid material separated therein and derived from the secondary chamber inwardly to the axial discharge throat, and means for supplying material for separation into the axial portion of the casing and clear of the stream of solid material being removed.

18. A centrifugal machine comprising a rotary casing having a primary separating chamber with a peripheral channel laterally thereof, said separating chamber having an axial discharge throat, a material-gathering arm within the separating chamber for directing material to the axial discharge throat and an angular extension carried by said arm and projecting laterally into the peripheral channel.

19. A centrifugal machine comprising a rotary casing having a primary separating chamber with a peripheral channel laterally thereof and provided with an axial discharge throat, material-gathering arms rotatively mounted within the separating chamber and inclined toward the axial discharge throat and angularly projecting extensions carried by said arms and entered in the peripheral channel to direct material in said channel into the operating realm of the gathering arms.

20. A centrifugal machine comprising a casing rotating on a substantially horizontal axis, said casing being provided with a primary separating chamber having an axial discharge throat at one end of the casing, a substantially horizontal shaft on which said casing is mounted and by which it is rotated, a sleeve journaled on said substantially horizontal shaft, material-gathering arms on said sleeve extending into the peripheral portions of the separating chamber and positioned to direct the separated material from such peripheral portions of the chamber to the axial discharge throat, and means for driving the sleeve from the shaft to rotate the gathering arms in the same direction as but at a different speed than the casing.

21. A centrifugal machine comprising a rotary casing, primary and secondary chambers in said casing, a filter chamber in the casing interposed between such primary and secondary chambers for retarding flow from the primary to the secondary chamber, and means within the primary chamber for removing the material separated in said chamber and the material fed back into said separating chamber under the retarding influence of the filter chamber.

In testimony that I claim the foregoing as my invention, I have signed my name hereto.

WILLIAM C. LAUGHLIN.